UNITED STATES PATENT OFFICE.

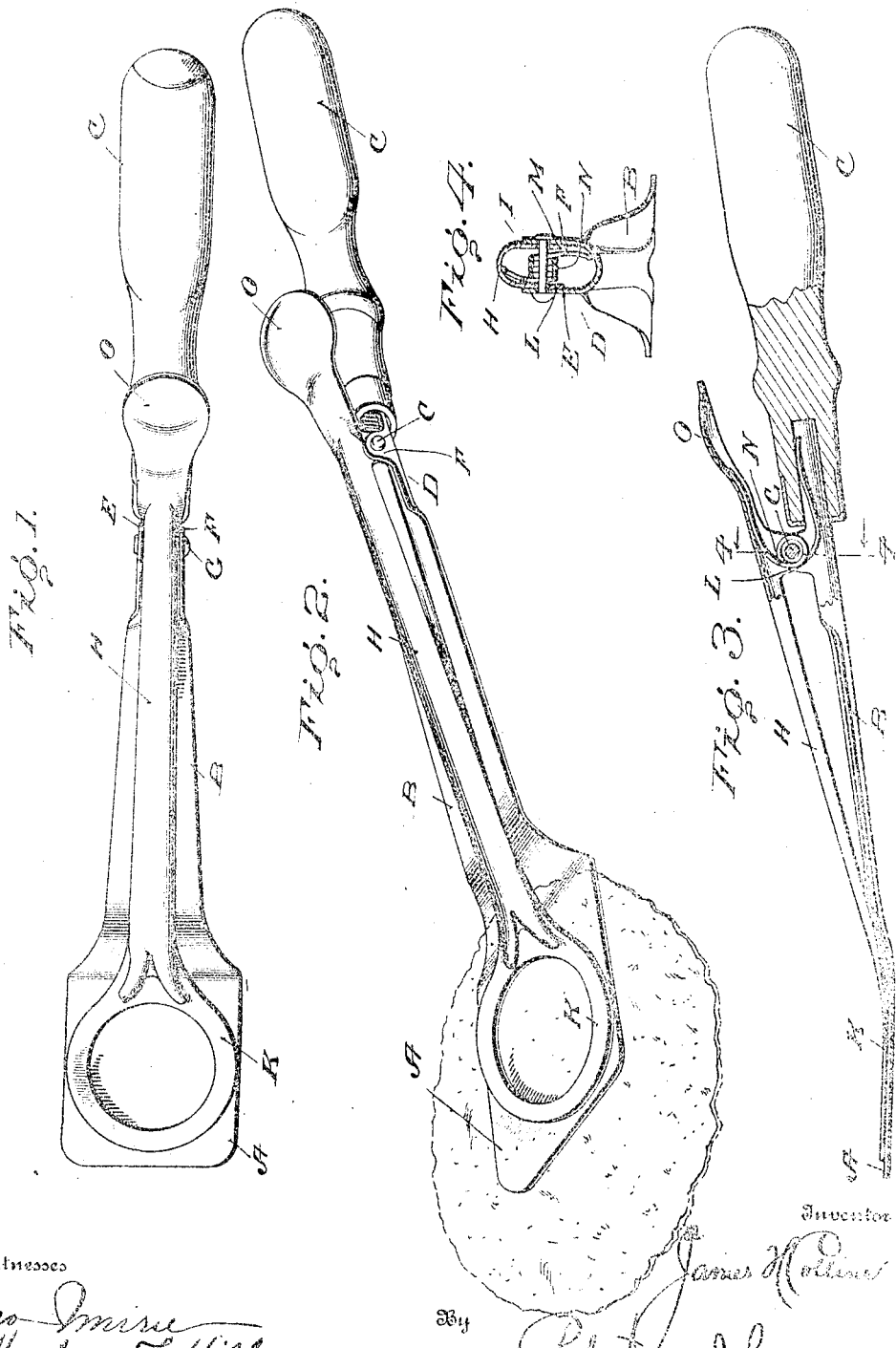

JAMES H. COLLINS, OF HARRISBURG, PENNSYLVANIA.

CULINARY UTENSIL.

No. 856,446.

Specification of Letters Patent.

Patented June 11, 1907.

Application filed October 22, 1906. Serial No. 340,053.

*To all whom it may concern:*

Be it known that I, JAMES H. COLLINS, of Harrisburg, in the county of Dauphin and State of Pennsylvania, have invented certain new and useful Improvements in Culinary Utensils, of which the following is a specification.

My invention relates to a culinary utensil for use in cooking foods of a soft nature, such as are difficult to handle with a fork or with an ordinary knife.

The utensil illustrated, described and claimed in this application is similar to that covered by my application Serial No. 286,926 filed November 11, 1905, but differs therefrom in some important particulars as will hereinafter appear.

Referring to the drawing: Figure 1 is a top plan view of the utensil. Fig. 2 is a perspective of the same. Fig. 3 is a side elevation partly in section. Fig. 4 is a transverse section on the line 4, 4 of Fig. 3.

The knife proper comprises a thin shovel shaped blade A having a shank B, and a heat insulating handle C. The shovel shaped portion of the blade is bent at an angle to the shank B which is gradually narrowed and bent up somewhat at the sides. Upon this narrowed or slanted portion is a support D integral therewith and comprising vertical posts E, F between which by a pin G is pivoted the holding lever H.

Both the blade A and the lever H are preferably stamped out of sheet metal, the shank B of the blade A being formed with a longitudinal, semicircular groove or channel running into grooves constituting a V at the beginning of the shovel portion. Similarly, the lever H is semicircular in cross section presenting a groove facing the groove in the shank B. This groove runs into short grooves constituting a V where the lever merges into the holding loop K which is shown in this instance as circular and normally lies flat against the shovel portion of the blade, being in substantially the same plane. This loop is bent at an angle to the body of the lever. This semi-tubular or channeled construction is a very strong one and most advantageous on that account. The provision of a flat sheet metal loop of some width is an advantage in that it enables the user of the utensil to hold the food without injuring it.

The lever H has a flattened portion I filling the space between the upright posts E, F on the shank B and comprising depending posts L, M co-acting with the said posts E, F. The said lever is held in position between these posts by the pin G before referred to and is normally forced into holding position with its loop against the shovel shaped blade by means of a spiral spring N coiled around the pin G, one end of the said spring being fastened to the handle or to the shank B of the blade and the other bearing against the underside of the thumb piece O which extends backwardly and upwardly from the holding lever back of its pivot. This piece is broadened out and is slightly convex to make the release of the lever by pressure of the thumb on the said portion O easier.

The utensil consists essentially of two parts, the blade and the holding lever, it being obvious that the pivot pin might be omitted by substituting for it projecting parts on one of these members co-acting with holes or depressions in the other, and that the spring while improving this implement is not essential.

It will be observed that this construction is rigid, so strong as to be practically indestructible; that the co-action between the stiff integral metal posts on the shank of the blade and on the holding lever maintains the lever always in precisely the correct position preventing sidewise play but permitting the ready operation of the lever to hold or release any article; that the shovel shape of the blade is most convenient, and that the flat sheet metal loop is very efficient.

What I claim as new is:

In a culinary utensil, a blade having a flat portion, a support thereon integral with the blade and having upright posts constituting a fork, and a holding lever pivoted in said support and comprising holding means, operating means, and a flattened portion comprising depending posts and filling the space between the upright posts on the blade so as to guide the lever and prevent its lateral displacement said holding means consisting of a flat sheet metal loop normally in substantially the same plane as the flat portion of the blade, substantially as described.

Signed by me at Harrisburg Pennsylvania this 19th day of October 1906.

JAMES H. COLLINS.

Witnesses:
FREDERICK M. OTT,
WILLIAM I. FURBER.